United States Patent Office 3,476,603
Patented Nov. 4, 1969

3,476,603
NITRILE COMPOSITE ELECTRODES
Robert R. Rafos, Lyndhurst, Ohio, assignor to The Standard Oil Company, Cleveland, Ohio, a corporation of Ohio
Filed Feb. 7, 1966, Ser. No. 525,558
Int. Cl. H01m 43/00
U.S. Cl. 136—22  7 Claims

ABSTRACT OF THE DISCLOSURE

An electrical energy storage device operable above the melting point of the electrolyte. The device employs a fused salt electrolyte and has at least one solid, porous electrode which is electrochemically preconditioned compacted and baked char of a polyvinyl nitrile resin which is a copolymer of a vinyl nitrile monomer and a polyalkemyl monomer.

Surface area is an important factor in controlling electrode performance, efficiency of use of the electrode being proportional to the surface area development of the electrode. For this reason the capacity of the electrode bears a direct relationship to surface area, but any discussion of surface area naturally involves the larger and equally important criteria or objectives of providing a reliable electric storage device, relatively simply, with relatively short charging time. All of these factors have been of primary importance in developing the improved electrode of the present invention, as will become evident from the following description.

Accordingly, it is a general object of the present invention to provide an electrode of increased surface area and consequently improved capacity for use in an electric energy storage device.

Figure 1:
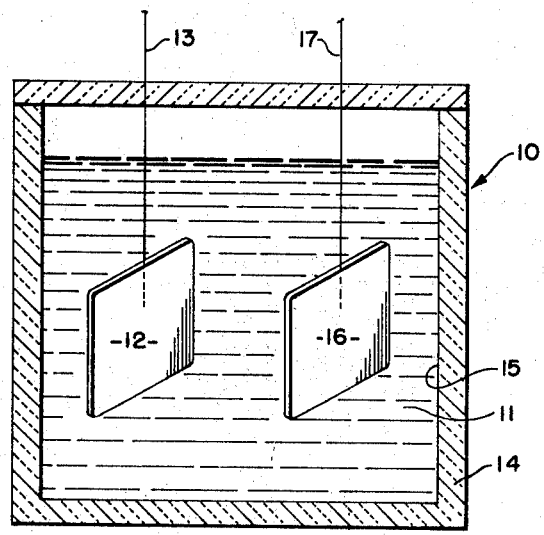
Figure 2:
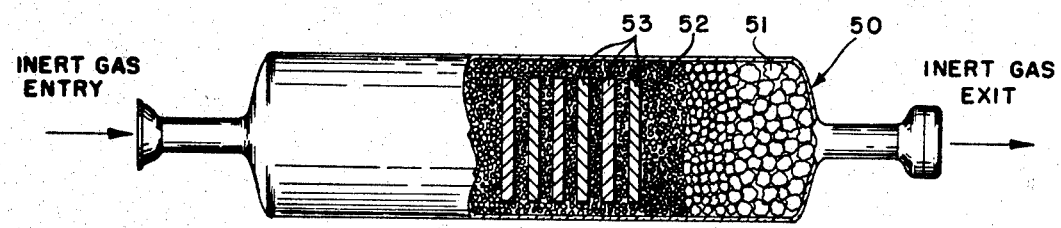

A preferred embodiment of a method and apparatus for carrying out this invention will be hereinafter more particularly described in conjunction with the accompanying drawing of which:

FIG. 1 is a schematic illustration of an electric energy storage device of this invention; and FIG. 2 is a schematic illustration of a combustion tube used in the method of the present invention.

It has now been discovered that a very useful polymeric, electrode material can be obtained by polymerizing a mixture of not more than 100 parts by weight of a vinyl nitrile monomer containing vinyl groups of the general formula

and, optionally, from about 0.5 to 5.0 parts by weight of a polyalkenyl monomer containing at least two polymerizable alkenyl groups and preferably at least two groups of the general formula

per monomeric unit separated by at least one other group. The polymeric electrode thus briefly described is used in spaced relationship opposite another electrode of similar or different material in an electrolyte to form an electric energy storage device which, in combination, responds to an electrical resistance load placed across the electrodes.

The vinyl nitrile monomer comprises copolymerizable vinyl nitrile monomers and their derivatives. Examples of useful vinyl nitrile monomers are acrylonitrile, alpha-methylacrylonitrile, alpha-ethylacrylonitrile, alpha-butyl-acrylonitrile, alpha-chloroacrylonitrile, methylacrylonitrile, crotononitrile, vinylidene cyanide, and mixtures thereof, with acrylonitrile being preferred.

The polyalkenyl monomers must contain at least two polymerizable alkenyl groups and preferably at least two

groups per monomeric unit separated by at least one other group. Such materials include allyl acrylate, allyl methacrylate, diallyl maleate, diallyl fumerate, ethylene glycol dimaleate, diallyl itaconate, methallyl acrylate, divinyl ether, diallyl ether, dimethallyl ether, ethylene glycol dimethacrylate, 1,1,1 - trimethoxypropanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl vinyl silane, tetraallyl germane, tetravinyl tin, tetravinyl germane, methylenebis-acrylamide, ethylene diacrylamide, N-allyl acrylamide, N,N-diallyl acrylamide, N,N-dimethallyl methacrylamide, and the polyallyl ethers of polyhydric alcohols.

The polymer thus described is prepared by polymerizing (suspension, emulsion, solution or mass) as a two step operation in a polymerization reactor or autoclave with the exclusion of air or in an inert atmosphere ($N_2$, He, A, $CO_2$, Ne). The vinyl nitrile monomer in "seed" quantities is charged to the polymerization reactor with the remaining components. Polymerization proceeds at about 30–100° C. until substantially all of the monomer is converted to polymer. At the end of this time, the remainder of the vinyl nitrile is added in a second step over a more extended period of time and polymerization is allowed to go to a high conversion of from about 70–100 percent conversion. The second major proportion of vinyl nitrile can be added to the "seed" polymer of the first step all at once or in increments or in a continuous manner.

Heat is applied as necessary to start or maintain the reaction. Heating can be accomplished by heating the liquid components first and pumping them to the reactors so that the polymerization mixture initially has a temperature of the aforementioned range or heating the components once they have been charged to the reactor. It is preferred to agitate the mixture during the polymerization to obtain the best particle size. If desired, polymerization can be short-stopped prior to completion by adding a short-stopping agent. Suitable modifiers, buffers, emulsifiers, and surface active agents can also be added to either step of the polymerization procedure.

The products of the polymerization are isolated as divided particles. For example the polymer is isolated by filtration or centrifugation, or the dispersion can be sprayed into a heated chamber where the occuled water is vaporized and polymer falls to the bottom of the chamber. Polymer can also be isolated by cooling the dispersion of polymer and water below the freezing point of the aqueous medium or by the addition of a large volume of an alcohol, such as methanol or ethanol. After precipitation of the polymers, the polymers are filtered and washed with water to remove catalyst residues and emulsifier, and dried.

Catalysts useful in the polymerization system herein include oxygen-liberating substances in general, and especially the water-soluble salts of perdisulfuric acid, such as the ammonium, sodium, potassium, lithium, barium, magnesium, and calcium persulfates. Other oxygen-liberating substances which may be used include lauroyl peroxide, acetyl peroxide, hydrogen peroxide, potassium persulfate, methyl ethyl peroxide, di-t-butyl peroxide, cumene hydro-peroxide, diisopropyl benzene hydroperoxide, p-methane hydro-peroxide, caprolyl peroxide, 2-4-dichlorobenzoyl peroxide, t-butyl perbenzoate, benzoyl peroxide and bis(p-chlorobenzoyl) peroxide.

Polymerization promoters, including oxygen-containing sulfur compounds capable of undergoing oxidation, can also be used. Examples of which are sodium bisulfite, sulfur dioxide, sodium hydrosulfite, sodium thiosulfate, diethyl sulfite and para-toluene sulfinic acid.

Anionic, cationic and non-ionic surface active agents or emulsifiers are useful in the present invention. Examples of the anionic surface active agents are the alkali soaps, such as sodium stearate, potassium oleate, potassium laurate, the soaps of water-soluble amines, the sulfonated oils, the sulfonated fatty alcohols, the sulfonaphthenates and petroleum sulfonates, the aromatic sulfonates, the sulfosuccinics acid esters, the arylalkyl sulfonates, the sulfonated amides, sulfonated phenols, as well as other sulfonated, phosphated or borated compounds.

Among the cationic surface active agents or emulsifiers are the quaternary ammonium salts of long-chain aliphatic or aromatic amines, long-chain guanidines, such as, for example, steryl trimethyl ammonium bromide.

Useful non-ionic surface active agents are the partial esters of polyhydric alcohols with long-chain carboxyl acids such as glycerol monooleate or monolaurate, and the partial and complete esters of certain water-soluble hydroxy alkyl ethers of polyhydric alcohols with long-chain carboxyl acids such as diethylene glycol monostearate. The non-ionic surface active agents are usually used in conjunction with a surface active agent of the cationic or anionic type to affect stabilization.

Other suitable surface active agents include sodium dodecyl sulfate, sodium hexadecyl sulfate, sodium tetradecyl sulfate, sodium acetoxyoctadecane sulfate, sodium tetradecane - 1-sulfonate, sodium octadecane-1-sulfonate, sodium alkylnaphthalene sulfonate, C-acetyl betaine, hydroxypropyl C-cetyl betaine, dodecyl trimethyl ammonium bromide, stearyl trimethylammonium bromide, the diethyl cyclohexylamine salt of hexadecyl sulfuric ester, partially saponified polyvinyl acetate, the sodium salt of methacrylic acid-methyl methacrylate copolymer, the phosphate ester emulsifying agent of the types

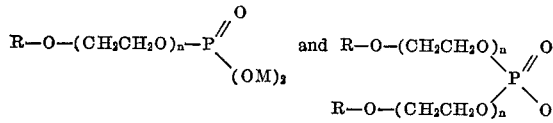

wherein R is a hydrocarbon group having from 8 to 27 carbon atoms, M is hydrogen, ammonium, potassium or sodium and $n$ is the number of ethylene oxide units required for a water number of at least 18 as more fully disclosed in United States Patent No. 2,853,471. Surface active agents are used in concentrations of from about 0.2 to 5.0 weight percent based on the weight of the aqueous medium in which the polymerization is carried out.

The polymer thus produced is heated in an inert atmosphere to a maximum temperature of 500° C. to char the polymer which begins to decompose at about 200° C., becomes dark, reddish-brown and viscid up to about 450° C. at which point it turns black. There is a volume shrinkage and weight loss of approximately 50 percent during this charring process. The polymeric char may be held at these high temperatures for any desired length of time, before cooling. After cooling, the polymeric char is ground to pass a 100 mesh screen and then mixed with a binder, if desired, as for example a coal tar pitch pressed at ambient temperatures into slugs slightly larger than the electrodes desired in the final product, at a compacting pressure high enough to permit adequate electrode conductivity, yet at a low enough pressure to permit adequate electrode porosity of from about 5,000 to 150,000 pounds per square inch. The pressed or compacted slugs are then baked in an oven in an inert atmosphere at a temperature high enough to bake out the binder, if used, and thereby make it conductive, yet at a low enough temperature to prevent formation of graphite of from about 700° C.-1200° C. for a period of approximately 24 hours.

The electrodes of the desired dimensions are cut from the baked slugs and attached with a conductive cement to carbon current collectors, the combination of which is baked in an atmosphere of nitrogen at a temperature of approximately 900° C. to cure the conductive carbon cement.

The electrode-current collector combination is then assembled in a suitable container containing a fused salt electrolyte as hereinafter described in more detail.

Generally speaking, the electrolyte is described as a medium comprising a source of ions which are mobile and free to move in the medium. The electrolyte may be referred to as any medium in which the disassociated ion can be rendered relatively mobile. It is contemplated by the present invention that the electrolyte be in a molten state at temperatures in the range of 350° C.-1000° C. and be derived from crystalline materials characterized by predominantly ionic lattice when in the crystalline state and can be disassociated to provide the requisite ion content and mobility in the molten state. Crystalline mixtures and individual crystalline materials can be employed.

A particularly useful electrolyte comprises lithium chloride and potassium chloride having a composition of from 40 to 60 mole percent lithium chloride and from 60 to 40 mole percent potassium chloride. Other electrolytes are useful, as for example, a sodium chloride, potassium chloride eutectic, sodium chloride, sodium chloride-aluminum trichloride.

The above-mentioned electrolytes when used in an electrical energy storage device as aforementioned are provided a means of heating to insure their remaining in the molten state. One means of heating is by use of an electrically resistive Nichrome wire or tape wound around, or surrounding, the container holding the electrolyte.

To more fully explain the invention, the following example is offered as illustrating the invention and is not to be construed as limiting the invention.

The following components were introduced into a polymerization reactor:

| Components: | Parts by weight |
|---|---|
| Acrylonitrile monomer | 96 |
| Tetramethylene diacrylate monomer | 0.5 |
| T-dodecyl mercaptan | 0.5 |
| Sodium metabisulfate in 15 parts by weight of water | 0.23 |
| Ammonium persulfate in 15 parts by weight of water | 0.5 |
| GAFAC RE-610 (emulsifier)[1] | 3.5 |
| Water | 370 |

[1] A mixture of 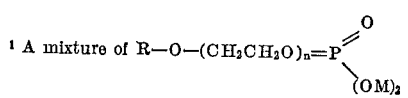

and

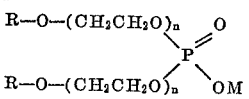

The 370 parts of water and 3.5 parts of GAFAC RE-610 emulsifier were placed in the polymerization reactor and heated to 60° C. with stirring as described above. The reactor was purged with nitrogen to remove all atmospheric air and the ammonium persulfate and sodium metabisulfate were added to the mixture, followed by the t-dodecyl mercaptan, the tetramethylene diacrylate and only 0.5 part of the acrylonitrile. Polymerization began at once and was allowed to continue for 30 minutes at the temperature of 60° C., after which time approximately 100 percent of the monomers initially present in the polymerization vessel had been converted to polymer.

After the 30 minute initial polymerization time, additional acrylonitrile monomer was added continuously through a dropping funnel over a three hour period, after which time 95.5 parts of acrylonitrile had been added. The polymerization was allowed to continue for an additional hour and the mixture then cooled. The polymer was separated by filtration, washed to remove catalyst residue and emulsifier, and dried.

One hundred grams of the granular polymeric resin thus formed was heated at a rate of 150° C. per hour, in an atmosphere of nitrogen, to a maximum temperature of 500° C. The temperature was maintained at 500° C. for four hours. Upon cooling, 57 grams of charred polymers was obtained.

The charred polymer thus prepared was ground to pass a 100 mesh screen and then mixed with 20 percent by weight of coal tar pitch. The mixture was then compressed into 1.5 inch diameter slugs at a molding pressure of 25,000 pounds per square inch.

The pressed slugs thus prepared were baked in an atmosphere of nitrogen at a temperature of 1000° C. for a period of 24 hours.

The baking was performed in a quartz combustion tube 50 as illustrated in FIG. 2, into which tube large pieces of petroleum coke 51 were introduced. The tube was then filled ¼ full with fine petroleum coke 52 and pressed slugs 53 introduced into the tube. The petroleum coke had previously been baked out at 1000° C. After the slugs had been placed in the combustion tube, additional petroleum coke was introduced into the tube until the slugs were completely covered. The tube was then connected to a source of inert gas (not shown) and the tube placed in a furnace. Inert gas was introduced through the tube and the temperature gradually raised to 1000° C. over a 24 hour period. The tube was subsequently withdrawn from the furnace, cooled, and the slugs removed.

After cooling, the electrode blanks were cut from the slugs. The electrode blanks were fastened with carbon cement (a phenolic resin) to a carbon rod current collector and the electrode-current collector assembly baked overnight, using a procedure similar to the above, in an atmosphere of nitrogen at a temperature of 900° C. to cure the connecting cement.

Referring to FIG. 1, one of the electrodes 12 thus prepared and attached to current collector 13 was installed in a simple electrical energy storage container 10 containing a molten salt electrolyte 11 consisting of 55 mole percent of potassium chloride and 45 mole percent lithium chloride in a metal or non-corrosive container 15 and insulated with insulation material 14. Electrode 16 opposing polymeric electrode 12 can be a metal, such as for example aluminum, calcium, lead or zinc and is connected to current collector 17. The combination of electrodes and electrolyte, comprising a cell was cycled by charging and discharging over a 12 hour period between −3.3 volts and 0 volt relative to chlorine evolution. Charging is equivalent to chemical oxidation and discharging is equivalent to chemical reduction of the electrodes.

After this conditioning, the energy storage capability was determined by measuring the energy delivered (after charging the cell at a constant voltage [3.3 volts] for 30 minutes) during a discharge at constant current (1 ampere) to zero volts across the electrical storage device. An average of a number of such runs was found to be a value of 54 watt-minutes per cubic inch of electrode of the invention which equals or surpasses the electrode energy storage capacity of any of the other electrodes known to date.

Observations of the surface areas of the charred polyacrylonitrile electrodes disclose that a very high surface area was generated during initial conditioning in the molten salt. After conditioning the polymeric electrodes were found to have a surface area of approximately 700 square meters per gram, as determined by the Brunauer, Emmet and Teller method.

What is claimed is:

1. An electrical energy storage device operable above the melting point of the electrolyte, comprising in combination:
   (a) a container;
   (b) a fused salt electrolyte disposed in said container;
   (c) means for maintaining the electrolyte in a molten condition;
   (d) a pair of electrodes contacting the electrolyte, at least one of said electrodes being solid and porous, and consisting essentially of char of a polyvinyl nitrile resin which is a copolymer of a vinyl nitrile monomer and a polyalkenyl monomer, said char being formed when said copolymer is heated to a temperature in the range of about 450° C. to about 500° C.

2. The device of claim 1, wherein the nitrile monomer contains at least one vinyl group of the general formula

and the polyalkenyl monomer contains at least two polymerizable alkenyl groups.

3. The device of claim 2, wherein two of the groups of the polyalkenyl monomer are separated by at least one other group.

4. The device of claim 2, wherein the copolymer consists essentially of not more than 100 parts by weight of the nitrile monomer and from about 0.05 to 5 parts by weight of the polyalkenyl monomer.

5. An electrical energy storage device comprising in combination:
   (a) a container;
   (b) a fused salt electrolyte disposed in the container;
   (c) means for maintaining the electrolyte in a molten condition;
   (d) a pair of electrodes immersed in the electrolyte, at least one of the electrodes consisting essentially of compacted and baked char of a copolymer of an acrylonitrile monomer and a tetramethylene diacrylate monomer, said char being formed when said copolymer is heated to a temperature in the range of about 450° C. to about 500° C.

6. The device of claim 5 wherein the electrodes are preconditioned electrochemically by charging and discharging at a potential relative to chlorine evolution.

7. A method for preparing a porous carbon electrode for use in an electrical energy storage device operable above the melting point of the electrolyte, comprising the steps of:
   (a) polymerizing a predetermined mixture of a vinyl nitrile monomer and a polyalkenyl monomer to form a copolymer;
   (b) heating the copolymer in an inert atmosphere to a temperature in the range of about 450° C. to about 500° C. to char the copolymer;
   (c) grinding the char to pass a predetermined mesh screen;
   (d) compacting the ground char into a predetermined electrode configuration;
   (e) baking the configured electrodes in an inert atmosphere at a temperature low enough to prevent formation of graphite;

(f) preconditioning the electrodes by electrochemically charging and discharging them in a molten salt electrolyte from about 0 to 3.0 volts with respect to chlorine evolution.

References Cited

UNITED STATES PATENTS

| | | | |
|---|---|---|---|
| 2,902,530 | 9/1959 | Eisen | 136—20 |
| 3,121,029 | 2/1964 | Duddy | 136—120 |
| 3,184,339 | 5/1965 | Ellis | 136—120 |
| 3,258,363 | 6/1966 | Lieb | 136—121 |
| 3,297,484 | 1/1967 | Niedrach | 136—120 |
| 3,297,490 | 1/1967 | Barber et al. | 136—122 |
| 3,322,576 | 5/1967 | Young | 136—121 |

WINSTON A. DOUGLAS, Primary Examiner

C. F. LEFEVOUR, Assistant Examiner

U.S. Cl. X.R.

136—83, 122

UNITED STATES PATENT OFFICE
CERTIFICATE OF CORRECTION

Patent No. 3,476,603                        November 4, 1969

Robert R. Rafos

It is certified that error appears in the above identified patent and that said Letters Patent are hereby corrected as shown below:

Column 3, line 23, "sulfosuccinics" should read -- sulfosuccini --; line 44, "C-acetyl" should read -- C-cetyl --. Column 4, line 2, after "pitch" insert -- and --. Column 5, line 24, "polymers" should read -- polymer --; line 66, "volt" should read -- volts --.

Signed and sealed this 10th day of November 1970.

(SEAL)
Attest:

Edward M. Fletcher, Jr.
Attesting Officer

WILLIAM E. SCHUYLER, JR.
Commissioner of Patents